US007983030B2

(12) United States Patent
Takayanagi et al.

(10) Patent No.: US 7,983,030 B2
(45) Date of Patent: Jul. 19, 2011

(54) ELECTRONIC APPARATUS AND PANEL (75) Inventors: Masaya Takayanagi, Kawasaki (JP); Masuo Ohnishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 52 days.

(21) Appl. No.: 12/285,782

(22) Filed: Oct. 14, 2008

(65) Prior Publication Data
US 2009/0244825 A1  Oct. 1, 2009

(30) Foreign Application Priority Data
Mar. 28, 2008 (JP) .................................. 2008-087067

(51) Int. Cl.
*H05K 5/00* (2006.01)
*H04M 1/00* (2006.01)

(52) U.S. Cl. ......... 361/679.26; 361/679.55; 361/679.21; 361/679.27; 455/575.1; 455/575.7; 455/575.8; 349/58

(58) Field of Classification Search ............. 361/679.01, 361/679.02, 679.08, 679.09, 679.3, 679.55–679.59, 361/679.21; 345/156, 157, 168, 169; 455/575.1
See application file for complete search history.

(56) References Cited

U.S. PATENT DOCUMENTS

| 7,319,584 B2 * | 1/2008 | Wang et al. ............... 361/679.55 |
| 2002/0067591 A1 * | 6/2002 | Tajima ......................... 361/681 |
| 2004/0180706 A1 * | 9/2004 | Pan ............................ 455/575.3 |
| 2005/0187784 A1 | 8/2005 | Bander et al. |
| 2005/0286002 A1 * | 12/2005 | Tajima ......................... 349/139 |
| 2006/0232920 A1 | 10/2006 | Miyamoto et al. |

FOREIGN PATENT DOCUMENTS

| CN | 1848033 | 10/2006 |
| JP | 2000-148028 | 5/2000 |
| JP | 2006-330127 | 12/2006 |

OTHER PUBLICATIONS

KIPO, Official Action mailed by the Korean Patent Office in connection with corresponding patent application KR 2008-0106989, on Mar. 22, 2010.
State Intellectual Property Office of China: "Chinese Office Action" mailed Dec. 3, 2010 for corresponding Chinese Patent Application No. 200810174107.2, with English-language translation.

* cited by examiner

*Primary Examiner* — Zachary M Pape
*Assistant Examiner* — Jerry Wu
(74) *Attorney, Agent, or Firm* — Fujitsu Patent Center (57) ABSTRACT An electronic apparatus has a panel that includes: a decorative plate which forms an outer surface; and a panel main body having an upright wall provided upright along the side surface of the decorative plate and surrounding the whole circumference of the decorative plate and having a depressed section surrounded by the upright wall into which the decorative plate is fitted. The panel main body includes a metal plate that forms a portion of the depressed section excluding a periphery section of the depressed section and inside the periphery section. The periphery section is close to the upright wall, and the resin frame forms a portion outside the metal plate including the periphery section. The metal plate and the resin frame are integrally molded.

9 Claims, 9 Drawing Sheets

Related Art

FIG. 3B

Related Art

FIG. 4

Related Art

ELECTRONIC APPARATUS AND PANEL

CROSS-REFERENCE TO RELATED APPLICATIONS

This application is based upon and claims the benefit of priority of the prior Japanese Patent Application No. 2008-087067, filed on Mar. 28, 2008, the entire contents of which are incorporated herein by reference.

FIELD

The embodiments are related to an electronic apparatus having a housing including a panel in the form of a plate forming one side of the housing and an electronic component housed in the housing, and to a panel in the form of a plate forming one side of a housing which houses an electronic component.

BACKGROUND

An electronic apparatus typically houses in a box-type housing various electronic components for realizing function depending on the electronic apparatus. As one of such electronic apparatus, there exists an electronic apparatus which holds a display plate having a display screen in the housing with the display screen appearing on an outer surface. Various electronic apparatus of this kind exist, such as, for example, notebook-type personal computers (hereinafter referred to as "notebook PCs"), cellular phones and game machines. In the following, description will be given using a notebook PC as an example.

A notebook PC is a personal computer basically having: a main unit which contains an arithmetic circuit including a CPU and the like, a storage device such as a hard disk drive, and many other electronic components, and which has a keyboard on the upper surface; and a display unit which has electronic components such as a display plate having a display screen and an antenna for wireless communication, and which holds the display plate with the display screen thereof appearing on an outer surface, and having a structure of the display unit being hinged to the main unit so as to be openable and closable.

Of this notebook PC as well as other portable electronic apparatus, there is a need for reducing the weight and thickness while securing a large size screen. As a measure for this reduction in the weight and thickness, it is practiced to use a metal plate such as a magnesium plate, for example, for the surface covering the back surface of the display plate of the display unit housing, and integrally mold the metal plate and a frame made of resin surrounding the periphery of the metal plate. One of the reasons for using a metal plate for the surface covering the back surface of the display plate of the display unit housing is to make the metal plate have the effect of an electrical shield so as to display on the display screen a clear screen free from noise. Japanese Laid-open Patent Publication No. 2000-148028 depicts an example in which a shield case is provided on the back surface of the display plate, and Japanese Laid-open Patent Publication No. 2006-330127 depicts an example in which a rear cover made of metal covering the back surface of the display plate and a joint section made of resin therearound are integrally molded.

Another reason for using a metal plate for the surface covering the back surface of the display plate of the display unit housing is reduction in the weight and thickness. To secure the shielding property alone, it is conceivable to use one made of resin instead of adopting a metal plate and secure the shielding properties by plating it with metal. However, securing a predetermined strength by one made of resin requires considerable thickness and consequently conflicts with the need for reduction in the weight and thickness. When a metal plate is used, a predetermined strength can be secured even by a considerably thin metal plate, which contributes to the reduction in the weight. However, if the covering is made by the metal plate alone, its shielding property in turn becomes a hindrance and an antenna cannot be contained in the housing. Therefore, the portion of the back surface of the display plate is covered with a metal plate and a resin frame is integrally molded around the metal plate, and the antenna is contained in the portion of the resin frame.

In order to form the panel forming the back side of the display unit housing by integrally molding a metal plate and a resin frame as described above is preferable from the viewpoint of securing the shielding property of the back surface of the display plate, securing good performance of the antenna, and reducing the weight and thickness; meanwhile, since the resin and metal plate being exposed would degrade the quality of the design, coating is applied to the surface. However, since there exist resin and metal, which are of different nature, in the surface, when coating is applied to the surface, it is difficult to be able to apply coating both to the resin and metal beautifully and maintain the surface in a beautiful state for a long period of time.

Although a beautiful state can be maintained for some length of time period by adopting an expensive coating material and giving two coats of a first coat and a second coat, for example, this is not always sufficient; for example, the coating material peels off if it is repeatedly touched by hands wet with sweat.

While Japanese Laid-open Patent Publications No. 2000-148028 and No. 2006-330127 disclose providing a shield plate on the back surface of the display plate or performing integral molding, they do not disclose any measures to address the problem described above.

SUMMARY

An electronic apparatus according to an aspect of the present invention includes:
 a housing which includes a plate-like panel forming one side of the housing; and
 an electronic component housed in the housing,
 wherein the panel comprises:
 a decorative plate which forms an outer surface of the one side, and
 a panel main body which has an upright wall provided upright along a side surface of the decorative plate and surrounding a whole circumference of the decorative plate, and which has a depressed section surrounded by the upright wall into which the decorative plate is fitted, and
 wherein the panel main body comprises a metal plate that forms a portion of the depressed section excluding a periphery section of the depressed section and inside the periphery section, the periphery section being close to the upright wall, the resin frame forming a portion outside the metal plate including the periphery section, the metal plate and the resin frame being integrally molded.

Objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENT

Embodiments of the electronic apparatus and the panel of the present disclosure will be described below.

Figure 1:
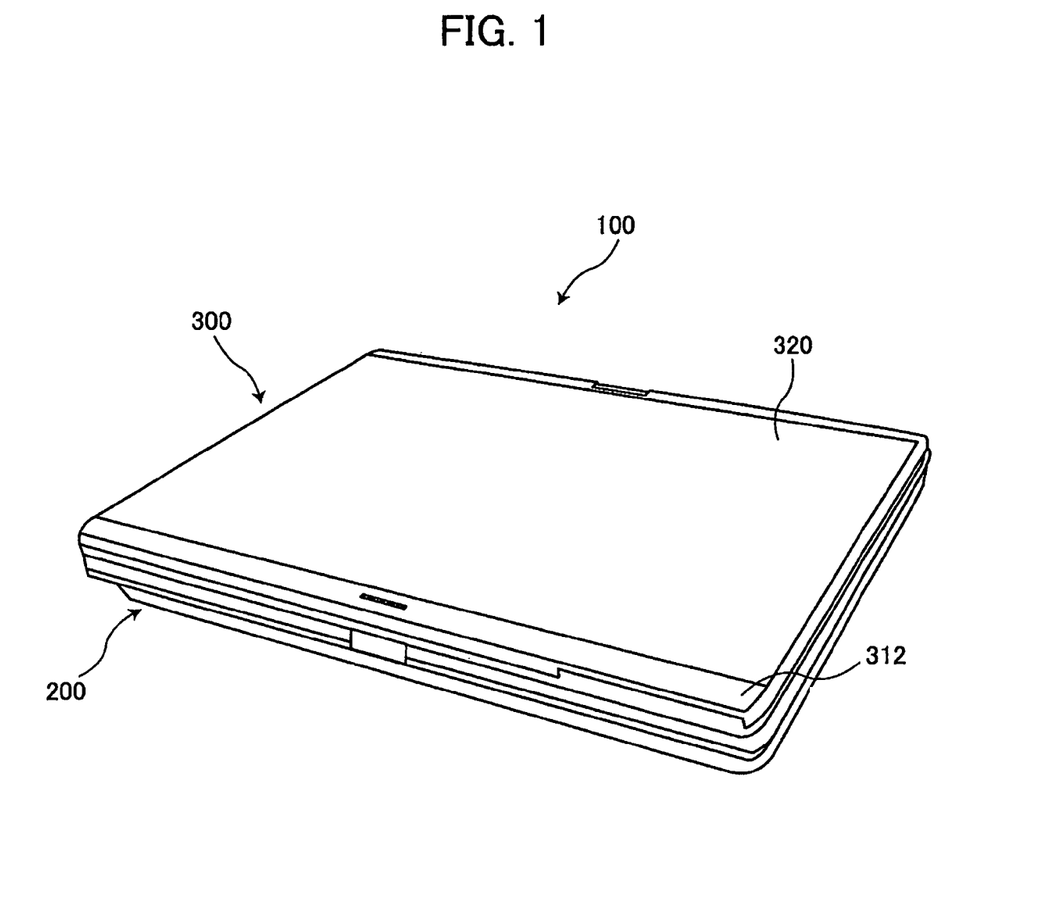
FIG. 1 is a perspective view of a notebook PC in a closed state.
Figure 2:
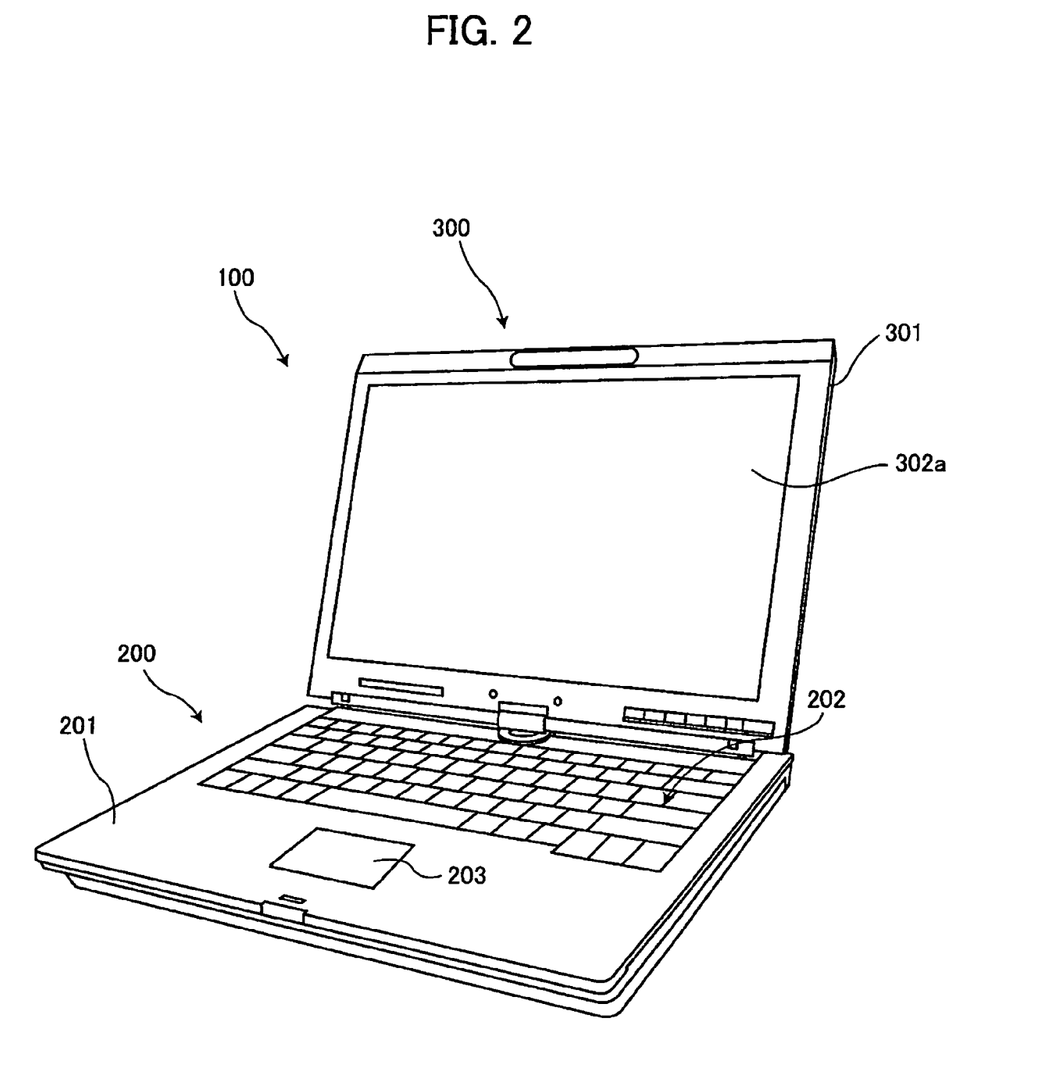
FIG. 2 is a perspective view depicting an open state of a notebook PC.

FIG. 1 is a perspective view of a notebook PC in a closed state, and FIG. 2 is a perspective view depicting an open state of the same notebook PC as in FIG. 1.

This notebook PC 100 has a main unit 200 and a display unit 300; the display unit 300 is connected to the main unit 200 so as to open and close with respect to the main unit 200 in a range between the closed state depicted in FIG. 1 and the open state depicted in FIG. 2.

A keyboard 202, a track pad 203 which is a type of pointing device, and the like are disposed on the upper surface of a housing 201 of the main unit 200.

Figure 8:
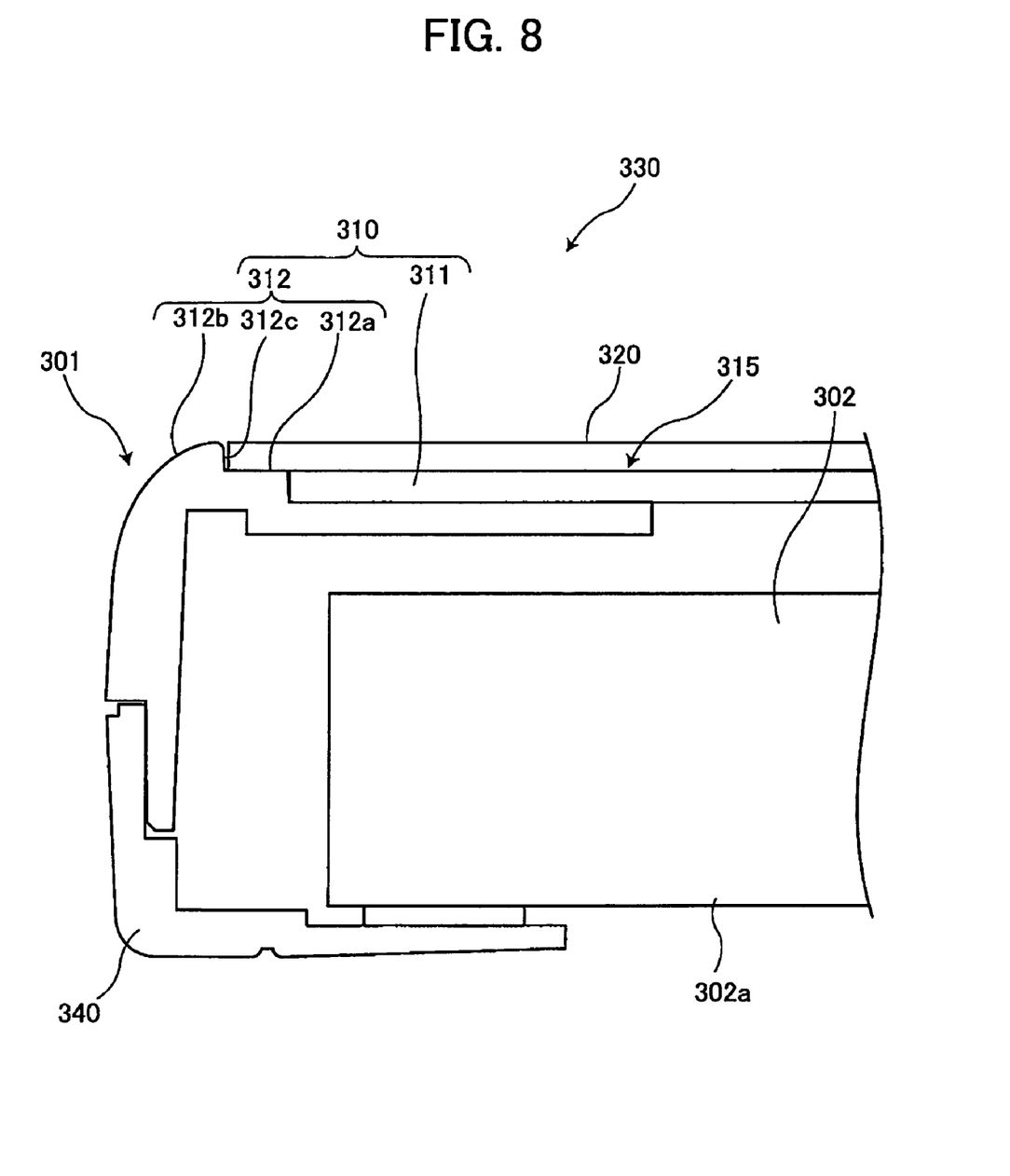
FIG. 8 is a sectional view of the part of the display unit.

In addition, a housing 301 of the display unit 300 holds a display plate 302 on the front surface of the display unit 300 such that a large size display screen 302a of the display plate 302 appears on the outer surface (see FIG. 8). A decorative plate 320 made of an acrylic plate or the like and a resin frame 312 surrounding the decorative plate 320 appear on the back surface of the display unit housing 301, as depicted in FIG. 1.

Figure 3A:
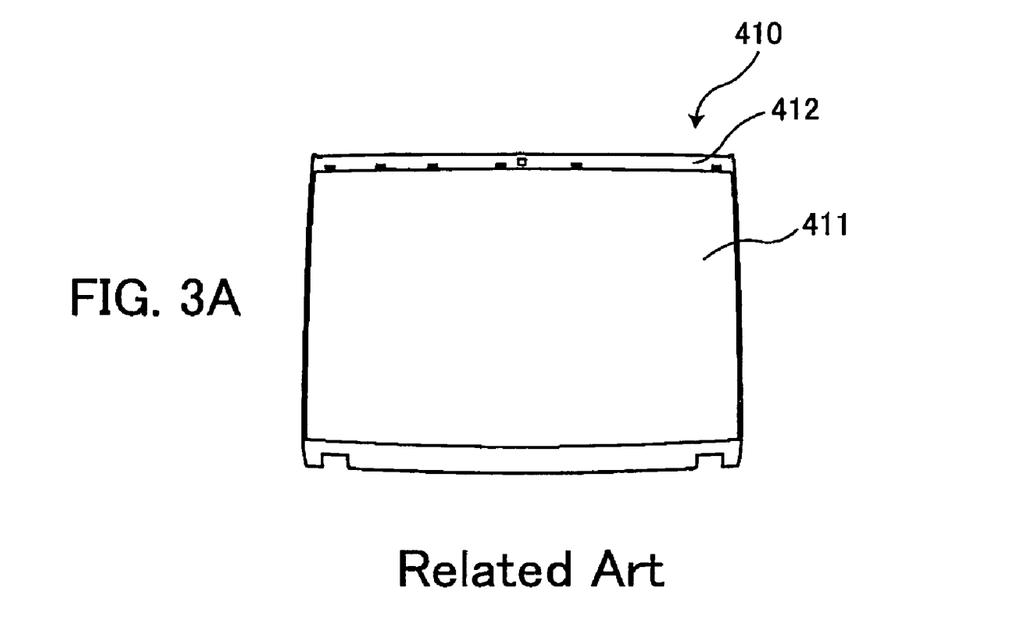
FIGS. 3A and 3B are views depicting the back surface panel of the display unit housing of a conventional notebook PC.
Figure 3B:
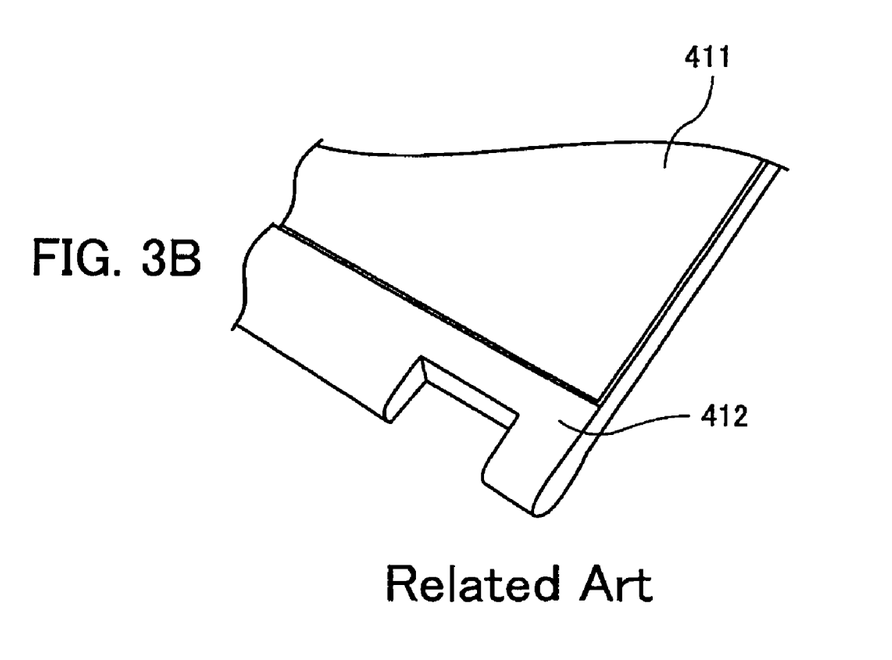
Figure 4:
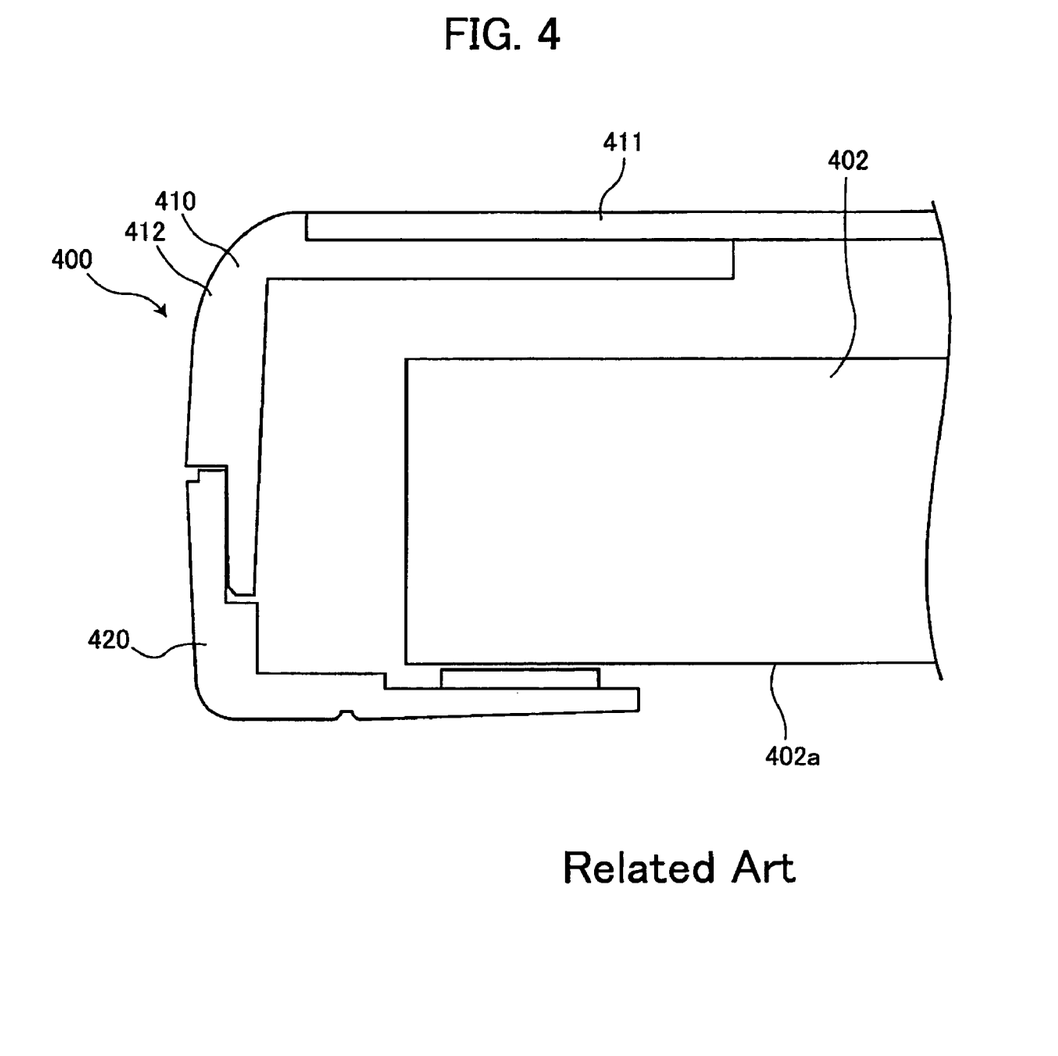
FIG. 4 is a partial sectional view of a conventional display unit.

FIG. 3 is a view depicting the back surface panel of a display unit housing of a conventional notebook PC, and FIG. 4 is a partial sectional view of a conventional display unit.

Here, a conventional example to be compared with the present embodiment will be described with reference to these FIGS. 3A, 3B and 4.

FIG. 3A is a view depicting the outer surface of a display-unit back surface panel, and FIG. 3B is an enlarged perspective view of a part thereof.

This back surface panel 410 has a metal plate 411 made of magnesium and a resin frame 412 surrounding the metal plate 411 integrally molded, the surfaces of the metal plate 411 and the resin frame 412 having the same height and being continuous, a coating material being applied thereon.

FIG. 4 depicts the structure of a display unit housing more clearly; this display unit housing 400 consists of a back surface panel 410 and a front frame 420, and holds therein a display plate 402 having a display screen 402a on the front surface, with the display screen 402a appearing on the outer surface. As described above, the back surface panel 410 has the metal plate 411 and the resin frame 412 integrally molded, the surfaces thereof forming continuous planes of the same height, coating being applied thereon. In addition, the front frame 420 is made of resin, being of the same material as the resin frame 412 of the back surface panel 410, and the same coating material as the back surface panel 410 is applied to the front frame 420.

The coating material used here needs to adhere to the metal plate 411 of the back surface panel 410 to keep it in good appearance for a long period of time, as well as adhere to the resin frame 412 of the back surface panel 410 and to the front frame 420 to keep them in good appearance for a long period of time.

However, a coating material which adheres to both the surface of metal and that of resin, which are of different natures, is expensive. In addition, even if two coats of a first coat and a second coat are given, the adherence, especially to the metal surface, is not always sufficient; there is a possibility that the coating material will peel off during a long period of use.

Next, the back surface panel of the present embodiment will be described.

Figure 5:
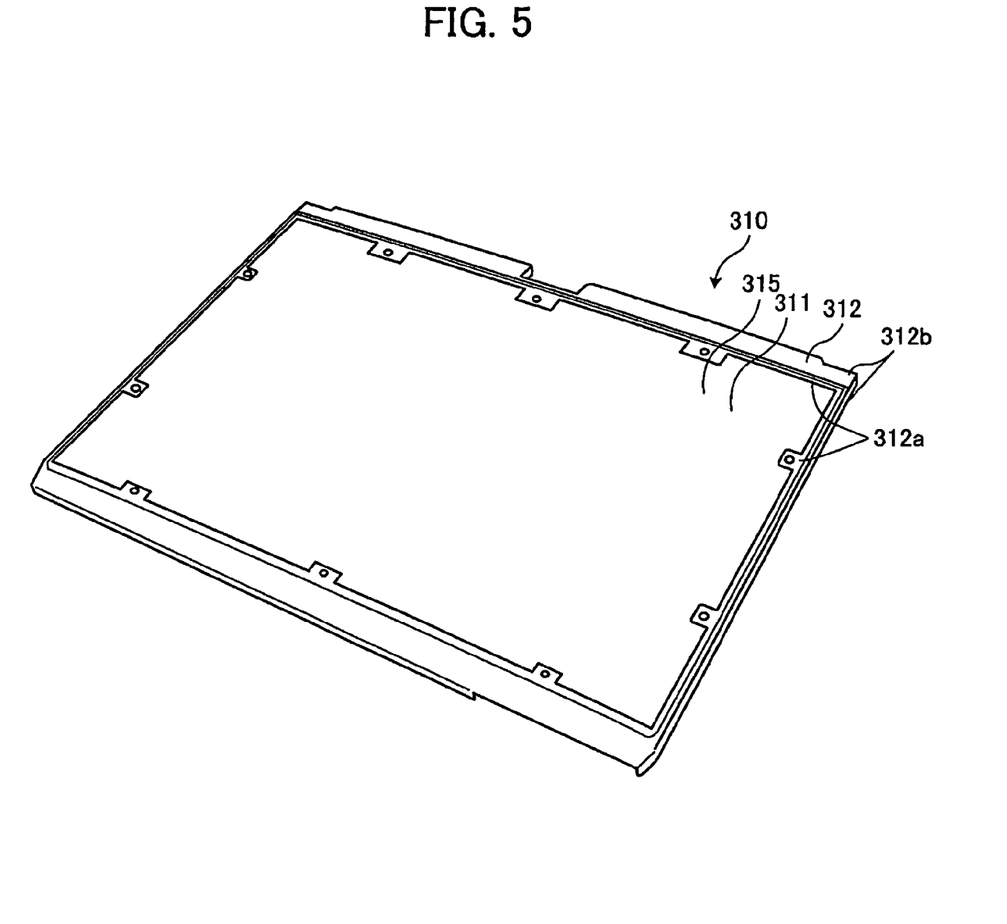
FIG. 5 is a view depicting the panel main body of the back surface panel of the display unit, the decorative plate being removed.
Figure 6:
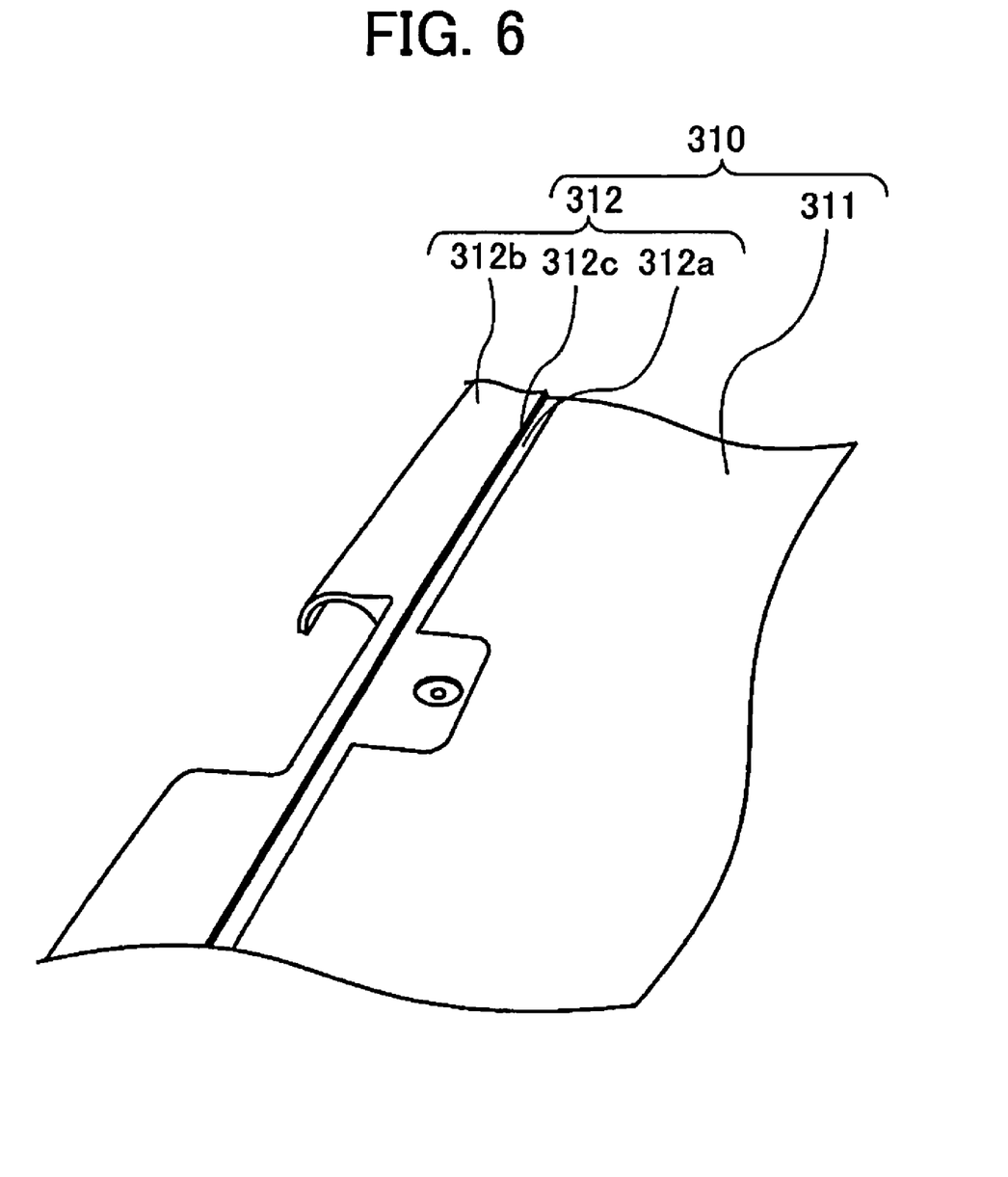
FIG. 6 is a view depicting part of the panel main body.
Figure 7:
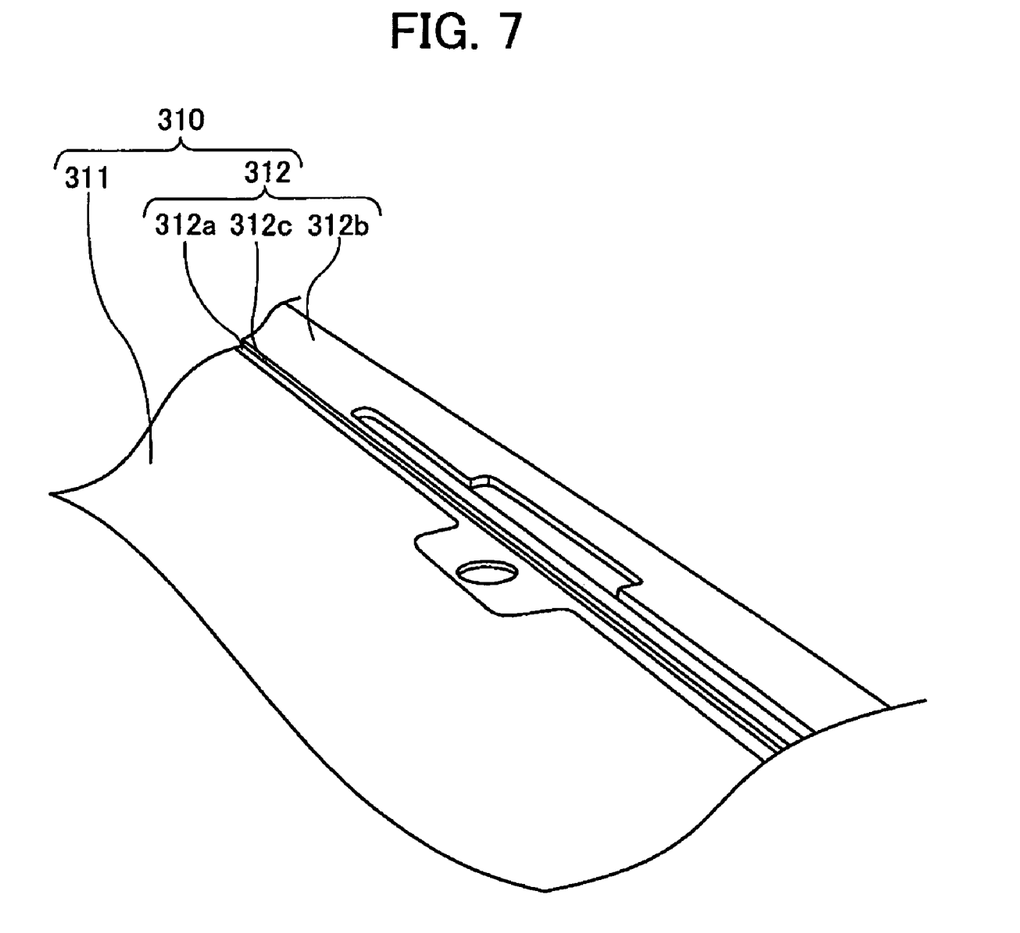
FIG. 7 is a view depicting a part of the panel main body.

FIG. 5 is a view depicting the panel main body of the back surface panel forming a part of the housing 301 of the display unit 300, the decorative plate being removed. FIGS. 6 and 7 are views respectively depicting part of the panel main body.

This panel main body 310 has a metal plate 311 made of magnesium and a resin frame 312. The metal plate 311 and a periphery section 312a of the resin frame 312, which is adjacent to the metal plate 311 and surrounds the periphery of the metal plate, are formed to be a little lower than an outer frame section 312b of the resin frame 312 by means of an upright wall 312c, thereby forming a depressed section 315 with the metal plate 311. The structure is such that the decorative plate 320 (see FIG. 1) is fitted into the depressed section 315.

FIG. 8 is a sectional view of a part of the display unit 300.

The display panel housing 301 includes a back surface panel 330 and a front frame 340 and holds in its interior space the display plate 302 having the display screen 302a on the surface, with the display screen 302a appearing on the outer surface.

The back surface panel 330 includes a panel main body 310, which has a metal plate 311 made of magnesium and a resin frame 312 surrounding the metal plate 311 integrally molded, and a decorative plate 320 made of acrylic. In addition, the front frame 340 is made of resin, being of the same material as the resin frame 312 of the back surface panel 330.

Here, the panel main body 310 has an upright wall 312c provided upright along the side surface of the decorative plate 320 and surrounding the whole circumference of the decorative plate 320, and a depressed section 315 which is surrounded by the upright wall 312c and into which the decorative plate 320 is fitted. As described above, the depressed section 315 includes the metal plate 311 made of magnesium and the periphery section 312a which is part of the resin frame 312. The resin frame 312 is provided outside the metal plate 311 while being adjacent to the metal plate 311 and close to the upright wall 312c.

Coating is applied to the frame section 312b outside the upright wall 312c of the resin frame 312. In this case, as for the coating material used for this coating, only the adhesiveness to the resin frame 312 needs to be considered so that it is relatively inexpensive and only one time of coating is required; even considering the cost increase due to providing the decorative plate 320, cost reduction is realized. In addition, color variations can be increased by adopting decorative plates of different colors or patterns.

Here, the decorative plate 320 is attached to the panel main body 310 with a double sided adhesive tape (not depicted). Although the double sided adhesive tape may be applied over the whole surface of the depressed section 315, it may also be applied only to the periphery along the upright wall 312c.

In addition, the front frame 340 is made of resin, being of the same material as the resin frame 312 of the back surface panel 330, and is coated with the same coating material as the resin frame 312.

Figure 9:
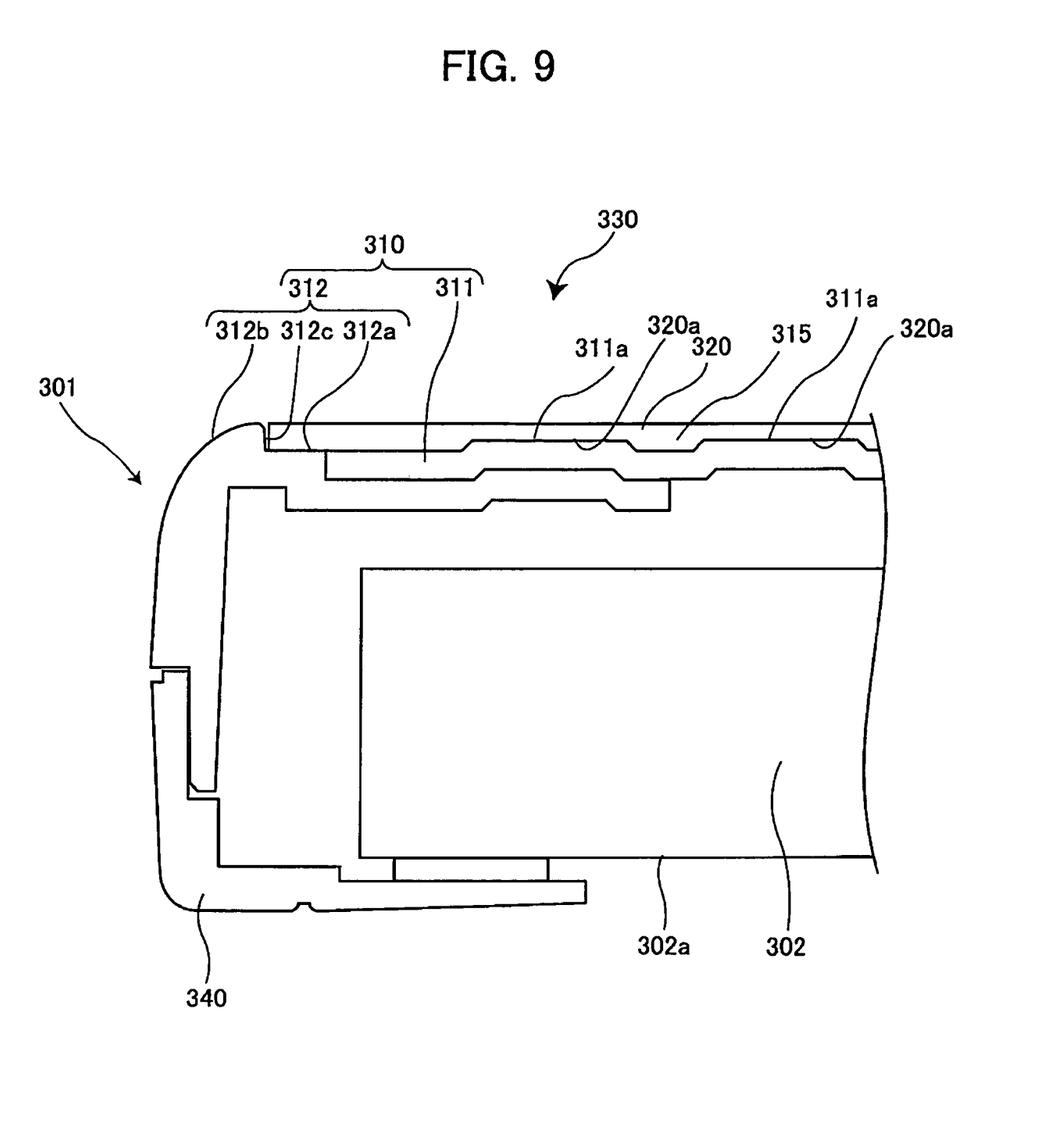
FIG. 9 is a sectional view depicting a variation.

FIG. 9 is a sectional view depicting a variation of the present embodiment.

Elements common to the sectional plane depicted in FIG. 8 are depicted by common reference numerals and the differences will be described.

In the variation depicted in FIG. 9, the metal plate 311 of the back surface panel 330 has a rib 311a protruding to the depressed section 315, and the decorative plate 320 has a groove 320a formed for housing the rib 311a.

The metal plate 311 has its strength further increased by having the rib 311a; for the same strength, a further thin metal plate can be used to realize further reduction of the thickness. In addition, the rib 311a fits into the groove 320a of the decorative plate 320 and does not appear outside, thereby keeping good appearance.

Although a notebook PC has been described here, the technical ideas of the present invention are not limited to notebook PCs but can be widely applied to electronic apparatuses having a display plate.

According to the electronic apparatus and panel of the present disclosure, the resin alone may be coated to fit in a decorative plate thereafter; the coating material may be one suitable for resin alone and an inexpensive and durable coating material can be used.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic apparatus comprising:
    a housing which includes a plate-like panel forming one side of the housing; and
    an electronic component housed in the housing,
    wherein the panel comprises:
        a decorative plate which forms an outer surface of the one side, and
        a panel main body which has an upright wall provided upright along a side surface of the decorative plate and surrounding a whole circumference of the decorative plate, and which has a depressed section surrounded by the upright wall into which the decorative plate is fitted, and
    wherein the panel main body comprises a metal plate that forms a portion of the depressed section excluding a periphery section of the depressed section and inside the periphery section, the periphery section being extended between the upright wall and the metal plate, and a resin frame that forms a portion outside the metal plate including the periphery section, the upright wall and an outer frame section adjacent to the upright wall, the metal plate and the resin frame are integrally molded, the outer frame section of the resin frame is coated by a coating material based on only the adhesiveness to the resin frame, and the decorative plate is mounted on the periphery section, covers an entire surface on a side of the metal plate and the periphery section, and forms an outer surface of the housing with the outer frame section.

2. The electronic apparatus according to claim 1, wherein the decorative plate is fixed to the panel main body by a double sided adhesive tape.

3. The electronic apparatus according to claim 1, wherein the panel main body has a rib protruding to the depressed section and the decorative plate has a groove which receives the rib.

4. The electronic apparatus according to claim 1, further comprising:
    a display plate comprising a display screen,
    wherein the housing is a first housing which holds the display plate with the display screen appearing on an outer surface and which has the panel on a surface covering a back surface of the display plate.

5. The electronic apparatus according to claim 4, further comprising a second housing which houses an electronic component and which has a keyboard on an upper surface, the first housing being attached to the second housing so as to be openable and closable.

6. A plate-like panel that forms one side of a housing which houses an electronic component, the plate-like panel comprising:
    a decorative plate which forms an outer surface of the one side; and
    a panel main body which has an upright wall provided upright along a side surface of the decorative plate and surrounding a whole circumference of the decorative plate, and which has a depressed section surrounded by the upright wall into which the decorative plate is fitted,
    wherein the panel main body comprises a metal plate that forms a portion of the depressed section excluding a periphery section of the depressed section and inside the periphery section, the periphery section being extended between the upright wall and the metal plate, and a resin frame that forms a portion outside the metal plate including the periphery section, the upright wall and an outer frame section, the metal plate and the resin frame are integrally molded, the outer frame section of the resin frame is coated by a coating material based on only the adhesiveness to the resin frame, and the decorative plate is mounted on the periphery section and covers an entire surface on a side of the metal plate and the periphery section, and the outer frame section forms an outer surface of the housing with the decorative panel.

7. The panel according to claim 6, wherein the decorative plate is fixed to the panel main body by a double sided adhesive tape.

8. The panel according to claim 6, wherein the panel main body has a rib protruding to the depressed section and the decorative plate has a groove which receives the rib.

9. The panel according to claim 6, wherein the panel forms a surface covering a back surface of a display plate of a housing, the display plate comprising a display screen, the housing holding the display plate with the display screen appearing on an outer surface.

* * * * *